(12) United States Patent
Furui

(10) Patent No.: US 8,456,482 B2
(45) Date of Patent: Jun. 4, 2013

(54) GAMMA CURVE ADJUSTMENT DEVICE AND METHOD OF ESTABLISHING ADJUSTMENT POINTS

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 770 days.

(21) Appl. No.: 11/500,448

(22) Filed: Aug. 8, 2006

(65) Prior Publication Data

US 2007/0047033 A1    Mar. 1, 2007

(30) Foreign Application Priority Data

Aug. 25, 2005    (JP) .................................. 2005-244453

(51) Int. Cl.
*G06G 5/00*    (2006.01)

(52) U.S. Cl.
USPC ........................................................ 345/581

(58) Field of Classification Search
USPC .......................................... 345/581; 358/519
See application file for complete search history.

(56) References Cited

U.S. PATENT DOCUMENTS

| | | | | |
|---|---|---|---|---|
| 5,796,399 A | * | 8/1998 | Alderson | 715/844 |
| 5,999,213 A | * | 12/1999 | Tsushima et al. | 348/180 |
| 6,266,103 B1 | * | 7/2001 | Barton et al. | 348/675 |
| 6,504,551 B1 | * | 1/2003 | Takashima et al. | 345/649 |
| 6,614,456 B1 | * | 9/2003 | Rzepkowski et al. | 715/833 |
| 6,844,881 B1 | | 1/2005 | Chen et al. | |
| 2002/0149607 A1 | | 10/2002 | Ito | |
| 2004/0246276 A1 | | 12/2004 | Koyama | |
| 2004/0252240 A1 | | 12/2004 | Mizusaki | |
| 2007/0285576 A1 | * | 12/2007 | Moore et al. | 348/674 |

FOREIGN PATENT DOCUMENTS

| | | |
|---|---|---|
| EP | 0 583 898 A2 | 2/1994 |
| EP | 0 583 898 A3 | 2/1994 |
| EP | 1 752 958 A2 | 2/2007 |
| JP | A-4-217186 | 8/1992 |
| JP | 11-234530 | 8/1999 |
| JP | A-2000-172825 | 6/2000 |
| JP | A-2002-135614 | 5/2002 |
| JP | A-2002-311915 | 10/2002 |
| JP | A 2003-060914 | 2/2003 |
| JP | A 2003-122336 | 4/2003 |
| JP | A 2003-298877 | 10/2003 |
| JP | A 2004-140702 | 5/2004 |
| JP | A 2005-099620 | 4/2005 |
| JP | 2005-215589 | 8/2005 |

OTHER PUBLICATIONS

European Patent Office, *European Search Report*, Oct. 26, 2009.

* cited by examiner

*Primary Examiner* — Edward Martello
(74) *Attorney, Agent, or Firm* — Oliff & Berridge, PLC

(57) ABSTRACT

There is provided a gamma curve adjustment device used to adjust the gamma curve indicating the relationship of input tone values to output tone values for use in a gamma correction circuit that performs gamma correction of an image signal. The gamma curve adjustment device includes a user interface module that permits a user to specify desired output tone values for a plurality of pre-established adjustment points on the gamma curve, and an adjustment module that adjusts the gamma curve such that the output tone value at each adjustment point assumes the value specified through the user interface module. The plurality of adjustment points are established such that a differential of input tone values between a first set of two adjustment points situated adjacently on the gamma curve differs from a differential of input tone values between a second set of two adjustment points situated adjacently on the gamma curve.

6 Claims, 4 Drawing Sheets

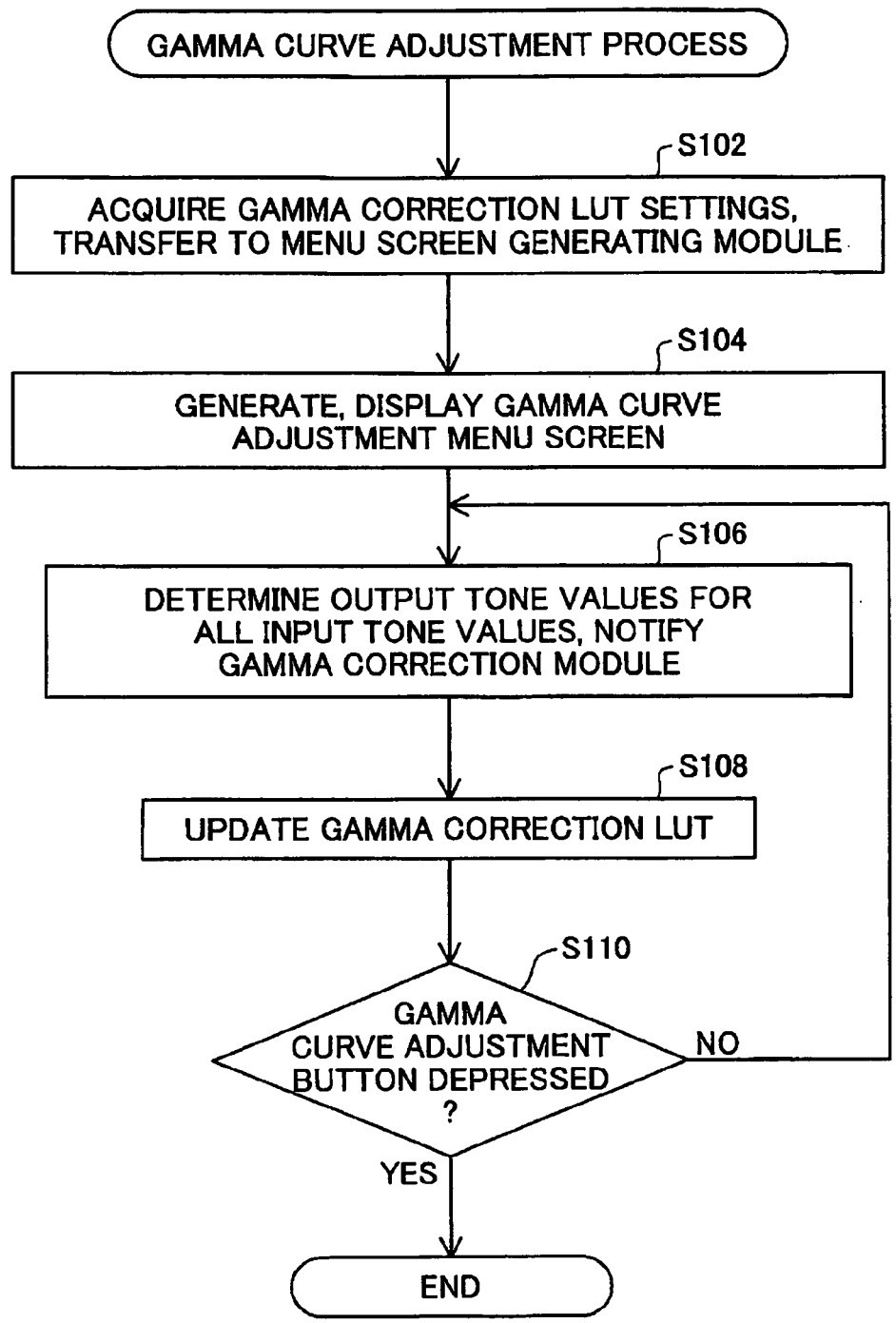

Fig.3A
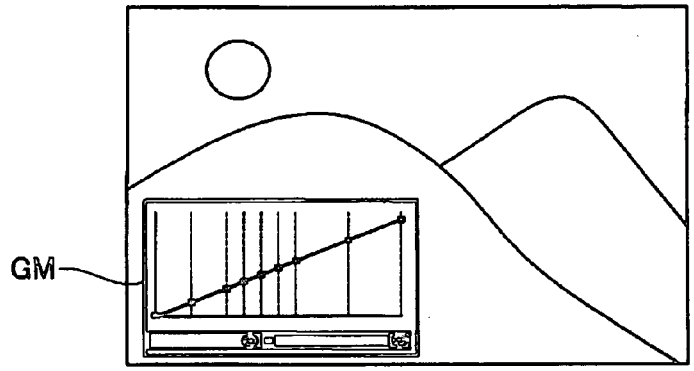
GM
Fig.3B
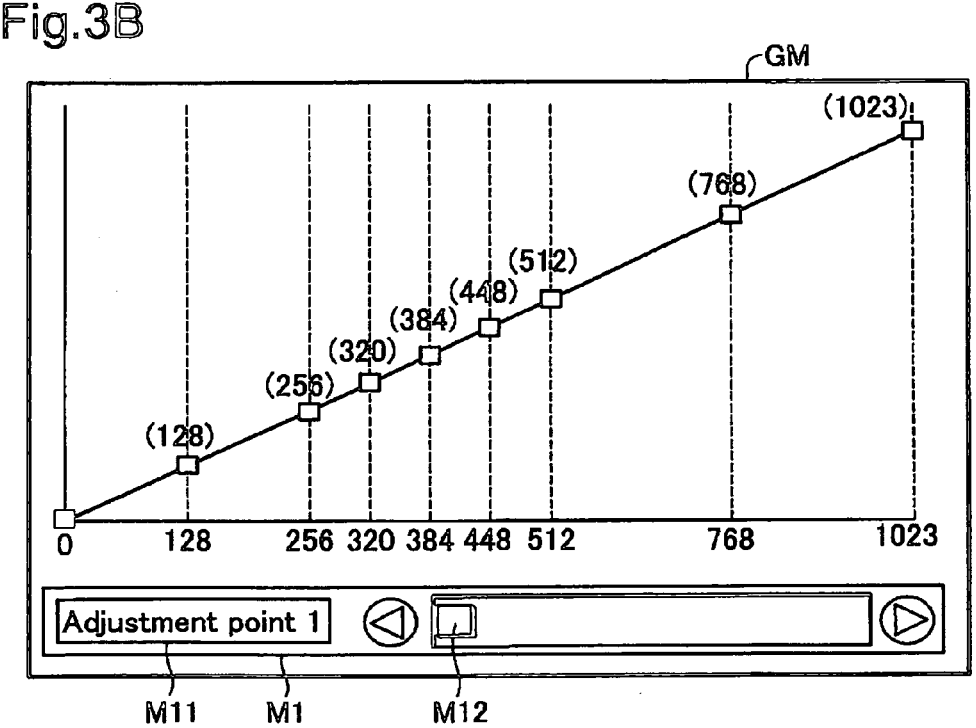
Fig.4
| Adjustment point | 1 | 2 | 3 | 4 | 5 | 6 | 7 | 8 | 9 |
|---|---|---|---|---|---|---|---|---|---|
| Input tone value | 0 | 128 | 256 | 320 | 384 | 448 | 512 | 768 | 1023 |
| Minimum increment/decrement unit | ±4 | ±4 | ±4 | ±4 | ±4 | ±4 | ±4 | ±2 | ±2 |

GAMMA CURVE ADJUSTMENT DEVICE AND METHOD OF ESTABLISHING ADJUSTMENT POINTS

CROSS REFERENCE TO RELATED APPLICATIONS

The present application claims the priority based on Japanese Patent Application No. 2005-244453 filed on Aug. 25, 2005, the disclosure of which is hereby incorporated by reference in its entirety.

BACKGROUND OF THE INVENTION

1. Field of the Invention

The present invention relates to technology for adjusting the gamma curve used in gamma correction.

2. Description of the Related Art

In image display devices such as projectors or liquid crystal displays, it sometimes occurs that an image which is actually displayed has lightness characteristics different from those of the input image, due to specific input/output characteristics of the device. In such image display devices, a so-called gamma curve indicating the relationship of input tone values to output tone values is pre-established in consideration of the input/output characteristics of the device, and gamma correction is performed through conversion of tone values of an input image in accordance with this gamma curve, so that the displayed image has lightness characteristics substantially identical to those of the input image.

There is sometimes a need to display such a gamma-corrected image as an image imparted with desired lightness characteristics with reference to considerations such as image content, for example, where it is desired to display an image that is lighter overall. Consequently, there have been proposed to date various image display devices that permit adjustment of the gamma curve, making it possible to display images having desired lightness characteristics.

There has also been proposed a gamma curve adjustment method which involves pre-establishing on the gamma curve a number of adjustment points corresponding to prescribed input tone values, and modifying the output tone values at these adjustment points to adjust the gamma curve (see JP2003-60914A, for example).

In the gamma curve adjustment method described in JP2003-60914A, consider the case where the plurality of adjustment points have been established as equidistant points with respect to input tone values, for example, as points at which input tone values in 10 bit tone data are 0, 128, 256, 384, 512, 768, 896, and 1023, respectively.

In this case, even if, for the purpose of deriving a gamma curve suitable for a relative dark image such as a movie, it were attempted to boost output tone values at relatively large number of points in the low tone range (the darker range), e.g. points at which input values are 10, 30, 60, 90, since adjustment points are not present at these points, a resultant problem is that the gamma curve cannot be adjusted to as to produce the desired gamma curve.

In the high tone range, on the other hand, despite the fact that it is sufficient to adjust a relatively small number of points, e.g. the two points at which input values are 768 and 1023, it is necessary to also adjust the adjustment point at which the input value is 896, a resultant problem is that gamma curve adjustment is time consuming.

Also, consider the case where, in the user interface for adjusting the gamma curve, the unit amount for increasing or decreasing output tone values (the minimum increment/decrement unit or the minimum/increment/decrement step) when specifying output tone values for adjustment points is set to a relatively small value, e.g. ±2 (tones), at all of the adjustment points.

In this case, if it is desired to specify an increase of an output tone value from 0 to 50 at the adjustment point at which the input tone value is 0 for example, it will be necessary to increase the output tone value 25 times (50÷2), and a resultant problem is that gamma curve adjustment is very time consuming.

Consider the case where, conversely, the aforementioned minimum increment/decrement unit is set to a relatively small value, e.g. ±4 (tones), at all of the adjustment points. In this case, as in the preceding case, if it is desired to specify an increase of an output tone value from 0 to 50 at the adjustment point at which the input tone value is 0 for example, since output tone value increases in increments of four tones, either 48 or 52 must be specified as the output tone value. A resultant problem is that the gamma curve cannot be adjusted in such a way as to produce the desired gamma curve.

SUMMARY OF THE INVENTION

An object of the present invention is to enable adjustment of the gamma curve within a short time, so as to produce the desired gamma curve.

According to an aspect of the present invention, there is provided a gamma curve adjustment device for use in a gamma correction circuit that performs gamma correction of an image signal, wherein the device is used to adjust the gamma curve indicating the relationship of input tone values to output tone values. The gamma curve adjustment device comprises: a user interface module configured to permit a user to specify, desired output tone values for a plurality of pre-established adjustment points on the gamma curve; and an adjustment module configured to adjust the gamma curve such that the output tone value at each adjustment point assumes the value specified through the user interface module. The plurality of adjustment points are established such that a differential of input tone values between a first set of two adjustment points situated adjacently on the gamma curve differs from a differential of input tone values between a second set of two adjustment points situated adjacently on the gamma curve.

Since the differential of input tone values between the first set of two adjustment points differs from the differential of input tone values between the second set of two adjustment points, adjustment points are densely present in the range in which the first set of two adjustment points are present. As a result, the gamma curve can be fine-tuned within this range. In the range in which the second set of two adjustment points are present, adjustment points are less densely present, within the entire range of input tone values. As a result, adjustment of the gamma curve can be carried out within a short time within this range.

The adjustment points may be established such that the differential of the input tone values between the first set of two adjustment points situated adjacently on the gamma curve in the low tone range of the input tone values is smaller than the differential of the input tone values between the second set of two adjustment points situated adjacently on the gamma curve in the high tone range of the input tone values.

Where the proportion of output tone values to input tone values in the intermediate tone range is increased (gain is increased), adjusting the gamma curve in such a way as to improve the tone representation, there will be a need to fine tune the gain increase, depending on the concentration of intermediate tones in an image. With the arrangement described above, since adjustment points are densely present in the low tone range for input tone values, it is possible to fine tune the gain increase in the low tone range.

Where gain is increased in the low tone range, there is no need to increase gain in the high tone range, so the number of adjustment points can be fewer in the high tone rage. Accordingly, with the above arrangement, relatively few adjustment points are present in the high tone range, making it possible to adjust the gamma curve within a short time.

The plurality of adjustment points may be established such that the differential of the input tone values between the first set of two adjustment points situated adjacently on the gamma curve in a first tone range from the lower 20% to 60% of the entire input tone value range is smaller than the differential of the input tone values between the second set of two adjustment points situated adjacently on the gamma curve in a second tone range of the entire input tone value range excluding the first tone range.

By so doing, adjustment points are densely present in the first tone range extending from the lower 20% to 60% of the entire input tone value range, making it possible to fine tune the gain increase in the low tone range. Also, relatively few adjustment points are present in the second tone range, making it possible to adjust the gamma curve within a short time.

The user interface module may be configured to increase or decrease the output tone values in units of minimum increment/decrement steps which are pre-established for adjustment points, thereby enabling the user to specify the output tone value at each adjustment point. The minimum increment/decrement steps may be established such that, for a least some adjustment points among the plurality of adjustment points, the minimum increment/decrement step established for these adjustment points differs from the minimum increment/decrement step established for other adjustment points.

By so doing, during modification and re-specification of output tone values, a larger minimum increment/decrement step can be established for adjustment points which are desired to produce greater modification of output tone values, as compared to other adjustment points, and consequently for these adjustment points, the desired output tone values can be specified within a short time. As a result, the gamma curve can be adjusted in such a way as to produce the desired gamma curve within a short time, as compared to where the same size of minimum increment/decrement step is established for all adjustment points.

The minimum increment/decrement steps for adjustment points may be established such that the minimum increment/decrement step established for the adjustment points present in the low tone range of the input tone values is greater than the minimum increment/decrement step established for the adjustment points present in the high tone range of the input tone values.

Where the gamma curve is adjusted so as to increase gain and improve tone representation in the intermediate tone range, output tone values change more in the low tone range. Consequently, according to the above arrangement wherein output tone values change more at adjustment points present in the low tone range with regard to input tone values, the desired values can be specified within a short time.

Additionally, where a relatively large number of adjustment points are present in the low tone range and a relatively small number of adjustment points are present in the high tone range as described previously, in the high tone range, the gamma curve will be adjusted with a small number of adjustment points, and consequently a large change in the gamma curve will be produced by a small change in output tone values at these adjustment points. Consequently, according to the above arrangement, output tone values at adjustment points in the high tone range can be adjusted relatively finely, whereby even where a relatively small number of adjustment points are present in the high tone range, the gamma curve can be adjusted in such a way as to produce the desired gamma curve.

The minimum increment/decrement steps for adjustment points may be established such that the minimum increment/decrement step established for the adjustment points present in a first tone range from the lower 20% to 60% of the entire input tone value range is greater than the minimum increment/decrement step established for the adjustment points present in a second tone range of the entire input tone value range excluding the first tone range.

By so doing, where output tone values undergo large change at adjustment points present in the first tone range extending from the lower 20% to 60% of the entire input tone value range, desired values can be specified within a short time. Even where relatively few adjustment points are present in the second tone range, output tone value can be adjusted relatively finely at these adjustment points, whereby the gamma curve can be adjusted in such a way as to produce the desired gamma curve.

According to another aspect of the present invention, there is provided an image display device comprising the gamma curve adjustment device a gamma correction circuit; and a display module. The gamma correction circuit is configured to perform gamma correction of an image signal, using the gamma curve adjusted by the gamma curve adjustment device, and the display module is configured to display an image according to the gamma-corrected image signal.

By so doing, in an image display device, the gamma curve can be adjusted in such a way as to produce the desired gamma curve, and on the basis of this gamma curve, images can be displayed with appropriate gamma correction.

The invention is not limited to device invention embodiments such as the gamma curve adjustment device and image display device described hereinabove, and may also be reduced to practice as a method invention, such as a method for establishing adjustment points or method for establishing minimum increment/decrement unit.

BRIEF DESCRIPTION OF THE DRAWINGS

FIG. 2 is a flowchart of the procedure of the gamma curve adjustment process in the embodiment;

FIGS. 3A and 3B illustrate the gamma curve adjustment menu screen in the embodiment;

FIG. 4 shows the minimum increment/decrement unit of output tone value established at each adjustment point.

DESCRIPTION OF THE PREFERRED EMBODIMENT

[Best Mode for Carrying Out the Invention]

The preferred embodiments of the present invention will be described below in the following order.

A. Embodiment:
  A1. General Projector Configuration and Image Projection Operation:
  A2. Gamma Correction:

A3. Gamma Curve Adjustment Process:
A4. Effects of the Embodiment:
B. Variation Examples:

A. Embodiment

A1. General Projector Configuration and Image Projection Operation

Figure 1:
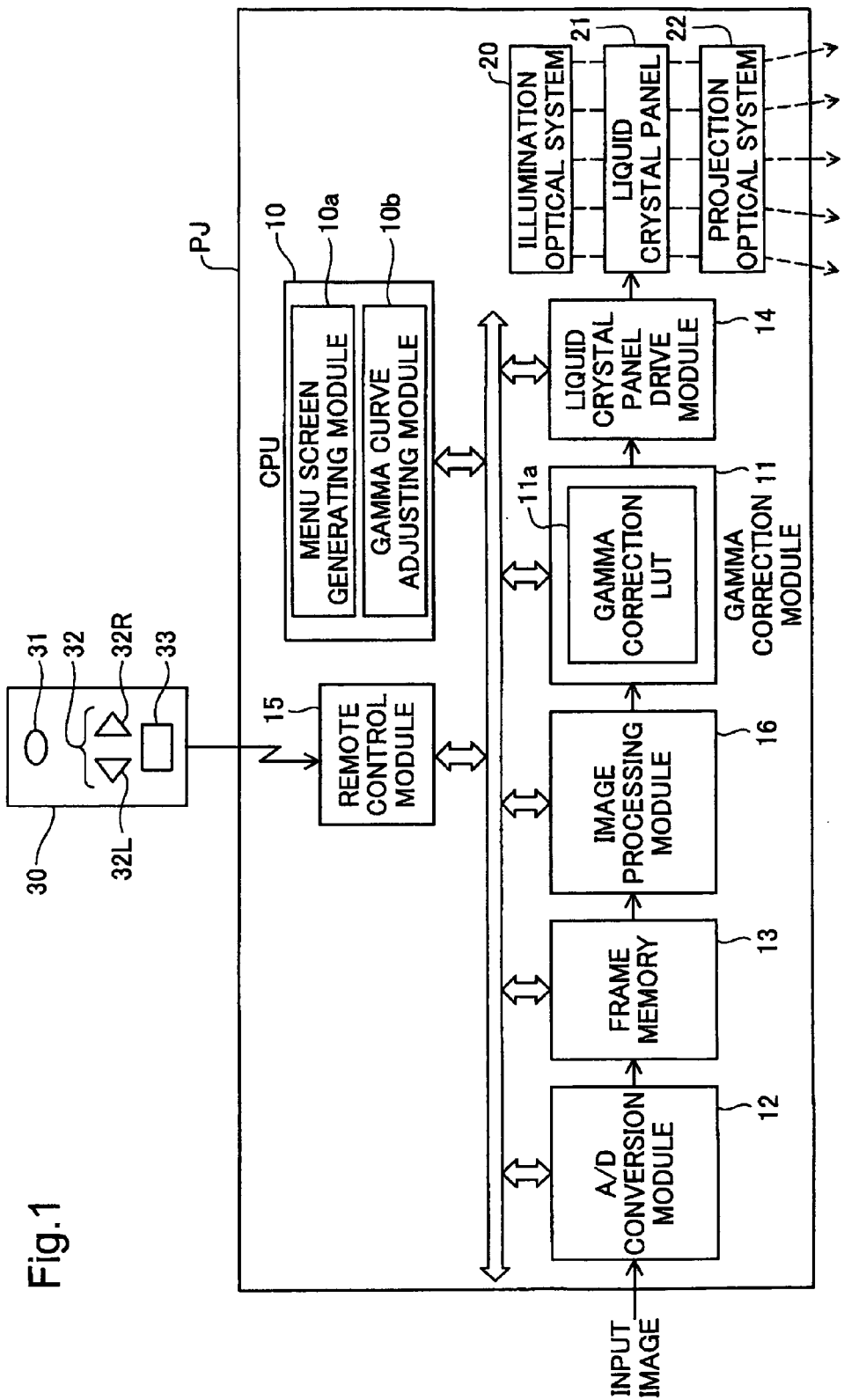
FIG. 1 illustrates the general configuration of a projector pertaining to an embodiment of the present invention.

FIG. 1 is an illustration depicting the general configuration of a projector pertaining to an embodiment of the present invention. This projector PJ comprises a CPU 10, a gamma correction module 11, an A/D conversion module 12, a frame memory 13, a liquid crystal panel drive module 14, a remote control module 15, and an image processing module 16, which are all interconnected by an internal bus. The projector PJ further comprises an optical system including an illumination optical system 20, a liquid crystal panel 21, and a projection optical system 22.

The gamma correction module 11 includes a gamma correction lookup table (LUT) 11a to which reference is made when performing gamma correction. Also provided in the projector PJ are computer programs stored in the memory (not shown); by executing the computer programs, the CPU 10 functions as a menu screen generating module 10a and a gamma curve adjusting module 10b. The projector PJ corresponds to the gamma curve adjusting device in the Claims, and the gamma curve adjusting module 10b to the adjustment module in the Claims, respectively.

A remote controller 30 for the projector PJ is provided as well; this remote controller 30 is equipped with a gamma curve adjustment button 31, left and right keys 32 consisting of a right key 32R and a left key 32L, and an OK button 33.

The image projection operation of the projector PJ will now be described in brief. First, the A/D conversion module 12 receives an analog image signal output from a TV or DVD player, or an analog image signal output from a PC, and converts the analog image signal to a digital image signal.

The image processing module 16 then temporarily stores in the frame memory 13 the image data representing the digital image signal output from the A/D conversion module 12. The image processing module 16 then reads out the image data stored in the frame memory 13, adjusts image attributes, such as contrast and size for example, to the desired attributes, and outputs the image to the gamma correction module 11. The gamma correction module 11 performs the gamma correction described later on the input image data, and outputs the gamma-corrected image data in the form of a digital signal to the liquid crystal panel drive module 14.

The liquid crystal panel drive module 14 drives the liquid crystal panel 21 on the basis of the input digital image signal. Consequently, in the liquid crystal panel 21, the illumination emitted from the illumination optical system 20 is modulated in accordance with the image information. The projection optical system 22 projects the projection light modulated by the liquid crystal panel 21 onto a screen, not shown. An image is shown projected onto the screen thereby.

Here, the image processing module 16 and the gamma correction module 11 are constituted as separate elements as described above; however, the image processing module and the gamma correction module could have an integrated arrangement instead.

A2. Gamma Correction

The gamma correction performed by the gamma correction module 11 will now be described. First, the gamma correction module 11 converts input RGB image data represented by tone values for R (red), G (green), and B (blue) into YUV image data represented by Y (luminance), U (color difference of luminance and blue), and V (color difference of luminance and red). Next, the gamma correction module 11 performs gamma correction for the Y (luminance) component of the converted YUV image data with reference to the gamma correction LUT 11a. In the reverse of the above process, the gamma correction module 11 then performs the YUV/RGB conversion of the gamma-corrected YUV image data, to derive gamma-corrected RGB image data.

Here, the aforementioned Y (luminance) can take the form of a 10-bit data ranging from minimum luminance (0) to maximum luminance (1023). The gamma correction LUT 11a is a table representing associations between luminance tone values of image data input to the gamma correction module 11 (input tone values) and gamma-corrected luminance tone values (output tone values).

The gamma correction LUT 11a is preset prior to shipping the projector PJ from the factory, in consideration of the input/output characteristics of the projector PJ. The projector PJ permits user adjustment of the gamma correction LUT 11a (gamma curve) while viewing the projected image, to allow the user to display an image having the desired lightness characteristic. The process of adjusting the gamma curve will be described below.

A3. Gamma Curve Adjustment Process

The gamma curve adjustment process presumes that the projector PJ is projecting an image specified by the user, by means of the image projection operation described previously. In this state, the user, by pressing the gamma curve adjustment button 31 of the remote controller 30, whereupon a gamma curve adjustment command is sent to the gamma curve adjustment module 10b via the remote control module 15, initiating the gamma curve adjustment process. For convenience in description, it is assumed that the gamma curve has been established such that input tone values and output tone values are equal in the initial state.

FIG. 2 is a flowchart of the procedure of the gamma curve adjustment process in the embodiment. When the gamma curve adjustment process of FIG. 2 is initiated, the gamma curve adjustment module 10b shown in FIG. 1 requests the gamma correction module 11 for the setting values of the gamma correction LUT 11a, and hands over these setting values to the menu screen generating module 10a (Step S102).

Next, on the basis of the setting values of the gamma correction LUT 11a, the menu screen generating module 10a generates a gamma curve adjustment menu screen for output to the image processing module 16, whereupon the image processing module 16 combines the input gamma curve adjustment menu screen and an image stored in the frame memory 13. As a result, the composite image is displayed on the screen by means of the image projection operation described above (Step S104).

FIGS. 3A and 3B illustrate the gamma curve adjustment menu screen in the embodiment. FIG. 3A depicts the composite image synthesized from the input gamma curve adjustment menu screen GM and the image stored in the frame memory 13. FIG. 3B depicts the input gamma curve adjustment menu screen GM in enlarged view.

As shown in FIG. 3A, as a result of the process of Step S104, the gamma curve adjustment menu screen GM is displayed superimposed over the lower left portion of the image (landscape image) stored in the frame memory 13. As shown in FIG. 3B, the gamma curve adjustment menu screen GM has a gamma curve on its upper side and an output tone value specifying portion M1 on its lower side, respectively. Input tone values and output tone values are given respectively on the horizontal axis and vertical axis of the gamma curve shown in FIG. 3B.

As shown in FIG. 3B, nine adjustment points, indicated by white or black squares, have been pre-established on the gamma curve for the purpose of adjusting the gamma curve. Specifically, adjustment point 1 (input tone value=0), adjustment point 2 (input tone value=128), adjustment point 3 (input tone value=256), adjustment point 4 (input tone value=320), adjustment point 5 (input tone value=384), adjustment point 6 (input tone value=448), adjustment point 7 (input tone value=512), adjustment point 8 (input tone value=768), and adjustment point 9 (input tone value=1023) have been established. The output tone values established at each adjustment point are shown in parentheses.

By specifying increase or decrease of output tone values at these nine adjustment points using the output tone value specifying portion M1, the user can adjust the gamma curve from the initial state depicted in FIG. 3B, to produce a desired gamma curve.

Here, as indicated in FIG. 3B, the input tone value differential between adjustment points is not constant; rather, the differential at adjustment points 1-3 is "128," while the differential at adjustment points 3-7 is "64" and the differential at adjustment points 7-9 is "256" or "255." Consequently, a relatively large number of adjustment points are present within the input tone value range of 256-512, as compared to other ranges.

Here, where the proportion of output tone values to input tone values in the intermediate tone range is increased (gain is increased) in the intermediate tone range, adjusting the gamma curve in such a way as to improve the tone representation, there will be a need to fine tune the location of the gain increase depending on the concentration of intermediate tones in the image. With the arrangement described above, since a relatively large number of adjustment points are present in the low tone range for input tone values, in particular, within the range 256-512 representing the lower 20% to 60% of the entire input tone value range of 0-1023, it is possible to fine tune the location of gain increase in the intermediate tone range.

The adjustment point represented by the black square indicates an adjustment point that has been selected; the adjustment points indicated by the white squares indicate adjustment points that have not been selected. Consequently, in the initial state depicted in FIG. 3B, adjustment point 1 has been selected.

The output tone value specifying portion M1 is furnished with an adjustment point display portion M11 for displaying the selected adjustment point, and a slider M12 for specifying an output tone value for the selected adjustment point. This slider M12 indicates an output tone value of "0" when positioned at the leftmost end, and of "1023" when positioned at the rightmost end. Consequently, in FIG. 3B, the slider indicates that the output tone value of the selected adjustment point 1 (input tone value=0) is "0."

From the gamma curve adjustment menu screen GM, by pressing the right key 32R or the left key 32L of the left and right keys 32 of the remote controller 30 depicted in FIG. 1, the user can select an adjustment point for adjustment, and by pressing the OK button 33 can confirm the adjustment point selected for adjustment.

For example, with the adjustment point 1 selected as shown in FIG. 3B, by pressing the right key 32R once and then pressing the OK button 33, adjustment point 2 can be selected as the adjustment point for adjustment.

With the adjustment point selected for adjustment confirmed in this way, by operating the left and right keys 32, the user can increase or decrease the output tone value of the confirmed adjustment point. Specifically, if the user presses the right key 32R, the slider M12 slides to the right in response and the output tone value increases. If the user presses the left key 32L, the slider M12 slides to the left in response and the output tone value decreases. When the output tone value has reached the desired value, by depressing the OK button 33, the user can specify the output tone value at the adjustment point selected for adjustment.

The distance which the slider moves to the right or left when the right key 32R or the left key 32L is pressed once, that is, the minimum increment/decrement unit for increasing or decreasing output tone values, has been pre-established for each individual adjustment point. This pre-established minimum increment/decrement unit will be discussed in detail later.

Returning now to FIG. 2, the gamma curve adjustment module 10b shown in FIG. 1 uses linear interpolation to calculate output tone values corresponding to input tone values between adjustment points, on the basis of the output tone values for adjustment points specified through the gamma curve adjustment menu screen GM; determines output tone values corresponding to all input tone values; and notifies the gamma correction module 11 (Step S106).

Next, the gamma correction module 11 updates the gamma correction LUT 11a with the output tone values with which it has been notified (Step S108). Consequently, the image gamma-corrected by the updated gamma correction LUT 11a is now shown projected onto the screen.

By viewing the image, the user can decide whether the gamma curve has been adjusted appropriately, and if he decides that further adjustment of the gamma curve is necessary, again modifies and specifies output tone values for the adjustment points from the gamma curve adjustment menu screen GM in the same manner as previously. If on the other hand the user decided that the gamma curve has been adjusted appropriately, he again presses the gamma curve adjustment button 31.

Returning now to FIG. 2, once the gamma curve adjustment process has been imitated, the gamma curve adjusting module 10b determines whether the gamma curve adjustment button 31 has been pressed again (Step S110), and in the event of a determination that it has been pressed, instructs the menu screen generating module 10a to delete the gamma curve adjustment menu screen GM, terminating the gamma curve adjustment process.

As a result of the gamma curve adjustment process described above, the gamma curve is adjusted appropriately, and the input image is projected as an image having the desired lightness characteristics.

The description now turns to the minimum increment/decrement unit pre-established for each adjustment point.

FIG. 4 is an illustration showing the minimum increment/decrement unit of output tone value established at each adjustment point. In FIG. 4, the top row gives the adjustment point number, the middle row gives the input tone value for each adjustment point, and the lower row gives the minimum increment/decrement unit, respectively.

As indicated in FIG. 4, for the adjustment points in the low tone range, namely, adjustment point 1 (input tone value=0) to adjustment point 7 (input tone value=512), a minimum increment/decrement unit of ±4 has been established. For the adjustment points in the high tone range, namely, adjustment point 8 (input tone value=768) and adjustment point 9 (input tone value=1023) on the other hand, a minimum increment/decrement unit of ±2 has been established.

Figure 5A:
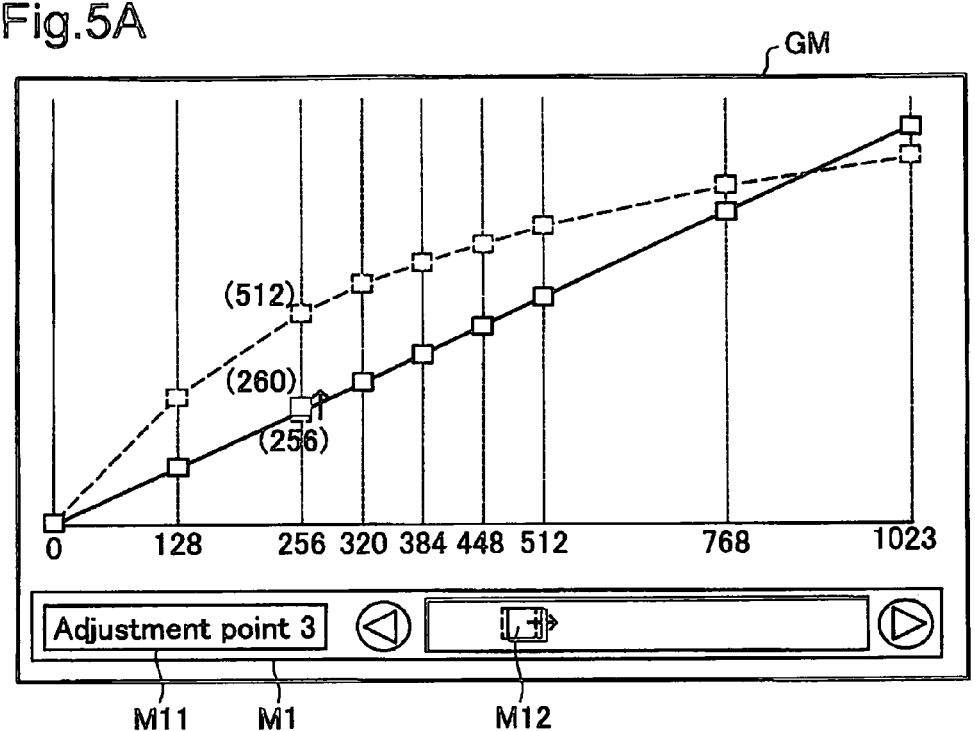
FIGS. 5A and 5B illustrate the gamma curve adjustment menu screen GM during specification of output tone values at adjustment point 3 and adjustment point 8.
Figure 5B:
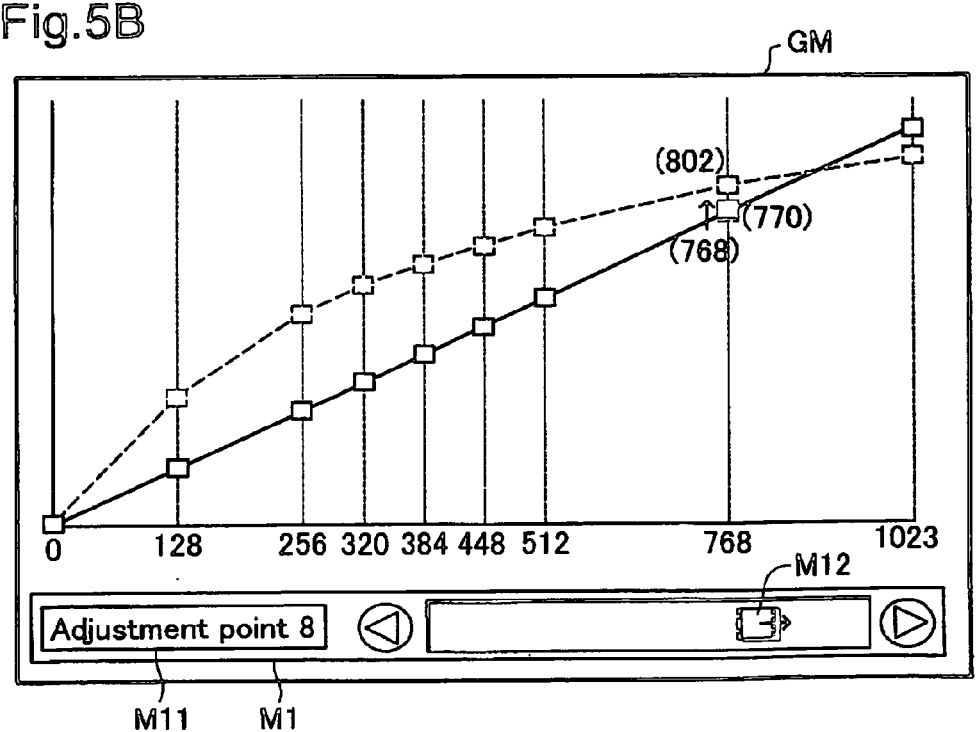

FIGS. 5A and 5B illustrate the gamma curve adjustment menu screen GM during specification of output tone values at adjustment point 3 and adjustment point 8. FIG. 5A depicts the gamma curve adjustment menu screen GM during specification of the output tone value at adjustment point 3 (input tone value=256), and FIG. 5B depicts the gamma curve adjustment menu screen GM during specification of the output tone value at adjustment point 8 (input tone value=768).

In FIGS. 5A and 5B, the gamma curve axes and the output tone value specifying portion M1 are respectively identical to those in FIG. 3, and shall not be described. In FIGS. 5A and 5B, the lines and adjustment points indicated by broken lines represent the gamma curves and adjustment points ultimately obtained by means of the gamma curve adjustment process.

For example, as depicted in FIG. 5A, where the user selects the adjustment point 3 and depresses the right key 32R of the remote controller 30 one time in order to set a value higher than the initial value (256) as the output tone value of the adjustment point 3, the slider M12 slides rightward by the minimum increment/decrement unit, and the black square adjustment point moves upward. At this time, as depicted in FIG. 4, since the minimum increment/decrement unit for the adjustment point 3 has been set to "±4," the slider M12 slides rightward by the equivalent of four tone levels, and the output tone value of the adjustment point 3 increases from 256 to 260.

If the user continues to depress the right key 32R, the output tone value of the adjustment point 3 increases in four tone level increments to 264, 268, 272, . . . 512. The user depresses the left and right keys 32 a total of 64 times until the output tone value of the adjustment point 3 goes from its initial value of 256 to the final specified value of 512.

If it were assumed that the same minimum increment/decrement unit of "±2" had been established for all of the adjustment points 1-9, the user would need to depress the right key 32R a total of 128 times for the output tone value of the adjustment point 3 to go from its initial value of 256 to the final specified value of 512.

Accordingly, by establishing a minimum increment/decrement unit of ±4 for the adjustment point 3 as in the embodiment, the number of times the user needs to depress the right key 32R is one-half that needed if the same minimum increment/decrement unit of "±2" had been established for all of the adjustment points 1-9. As a result, a desired value can be specified as the output tone value, within a shorter time. Additionally, since a minimum increment/decrement unit of "±4" has been established for the adjustment points 1-7, a desired value can be specified as the output tone value within a shorter time, in the same manner as for the adjustment point 3.

In this way, by establishing a relatively large value for the minimum increment/decrement unit for the adjustment points in the low tone range, in the event it is desired to make a large change in an output tone value in the low tone range, the gamma curve adjustment process can be completed within a short time.

On the other hand, where as depicted in FIG. 5B the user selects the adjustment point 8 and depresses the right key 32R of the remote controller 30 one time in order to set a value higher than the initial value (768) as the output tone value of the adjustment point 8, as with the adjustment point 3 discussed previously, the slider M12 slides rightward by the minimum increment/decrement unit, and the black square adjustment point moves upward. At this time, as depicted in FIG. 4, since the minimum increment/decrement unit for the adjustment point 8 has been set to "±2," the output tone value of the adjustment point 8 increases from 768 to 770.

If the user continues to depress the right key 32R, the output tone value of the adjustment point 8 increases in two tone level increments to 770, 772, 774, . . . 802.

Here, if it were assumed that the minimum increment/decrement unit was the same "±4" for all of the adjustment points 1-9, with successive depression of the right key 32R the output tone value of the adjustment point 8 would increase in the order 768, 772 776, . . . 800, 804. Accordingly, it would not be possible for the use to specify the desired output tone value of "802" as the output tone value of the adjustment point 8, making it necessary to instead specify a value in excess of the tone value 802 (804) or a smaller value (800).

By establishing a minimum increment/decrement unit of ±2 for the adjustment point 8, the output tone value of the adjustment point 8 can be adjusted more finely than if the same minimum increment/decrement unit of "±4" had been established for all of the adjustment points 1-9, whereby the output tone value can be adjusted more finely.

In the high tone range, since there are only two adjustment points (adjustment points 8, 9) with relatively far apart tone values, the gamma curve changes appreciably with a small change in output tone values of these adjustment points. Consequently, output tone values can be adjusted more finely at these adjustment points 8, 9, thereby making it possible to adjust the gamma curve to the desired gamma curve.

While the output tone value at the adjustment point 9 (input tone value=1023) may change as well as depicted in FIG. 5B, it is also possible for the adjustment point 9 and the adjustment point 1 (input tone value=0) to remain unchanged.

A4. Effects of the Embodiment

As described hereinabove, in the embodiment, the differential of input tone values between adjustment points is not constant; rather, the differential of input tone values between two adjustment points present in the low tone range of the input tone values is smaller than the differential of input tone values between adjustment points present in the high tone range, In particular, it is set to a smaller value (64) at adjustment point 3 (input tone value=256) to adjustment point 7 (input tone value=512).

By so doing, it is possible to adjust the gamma curve at more points in the low tone range, particularly within a range from the lower 20% to 60% of the input tone value range. As a result, it is possible to finely adjust the gain at many positions in the intermediate tone range, depending on the concentration of intermediate tones in an image, and to thereby adjust the gamma curve so as to improve tone representation.

Rather than establishing a constant value of minimum increment/decrement unit for all the adjustment points, a relatively large value is established for adjustment points present in the low tone range. As a result, the gamma curve can be easily adjusted to the desired gamma curve, even in instances where the gamma curve is adjusted through large change in output tone values in the low tone range.

Meanwhile, for adjustment points present in the high tone range, a relatively small value is established as the minimum increment/decrement unit, and the number of adjustment points in the high tone range is small. Accordingly, the gamma curve can be adjusted to the desired gamma curve even in instances where change in the output tone values of these adjustment points has a large effect on the gamma curve.

B. Variatiion Examples

The present invention is not limited to the embodiment set forth hereinabove, and may be reduced to practice in various other forms without departing from the spirit thereof, such as the following variations, for example.

B1. Variation Example 1

In the embodiment hereinabove, the adjustment points are established in such a way that the differential of input tone values between adjustment points is not constant, and minimum increment/decrement units are not set to the same value for all of the adjustment points; however, the invention is not limited to this arrangement.

Specifically, it would be acceptable while establishing the adjustment points in such a way that the minimum increment/decrement unit is set to the same value for all of the adjustment points, while the differential of input tone values between adjustment points is not constant. Alternatively, it would be acceptable to establish the adjustment points in such a way that the differential of input tone values between adjustment points is constant, while the minimum increment/decrement units are not set to the same value for all of the adjustment points.

By establishing the adjustment points and minimum increment/decrement unit in these ways as well, the gamma curve can be adjusted within a short time so as to produce the desired gamma curve.

B2. Variation Example 2

In the embodiment hereinabove, the minimum increment/decrement unit was set to ±4 for adjustment point 1 through adjustment point 7, and to ±2 for adjustment point 8 and adjustment point 9; however, the invention is not limited to this arrangement. For example, a larger value such as ±6 or ±8 could be established for adjustment point 1 -adjustment point 7 in the range of the lower 20%-60% of the entire input tone value range.

By setting the minimum increment/decrement unit in this way, where the gamma curve is to be changed to a greater degree in the range of the lower 20%-60% of the entire input tone value range, the gamma curve can be adjusted to the desired gamma curve within a shorter time.

It is also possible to set the minimum increment/decrement unit for the adjustment points 8, 9 to a smaller value of ±1. By so doing, output tone values of adjustment points present in the high tone range can be adjusted more finely.

B3. Variation Example 3

In the embodiment hereinabove, there are three steps of differential of input tone values between the adjustment points, namely "128" (adjustment points 1-3), "64" (adjustment points 3-7), and "256 (255)" (adjustment points 7-9); however, the invention is not limited to this arrangement.

For example, it would be possible to employ a two-step arrangement having a differential of "64" for the adjustment points 1-7 and of "256 (255)" for the adjustment points 7-9. Additionally, the differential value of each stage can be set to a value different from those in the preceding embodiment, for example, to a value of "60" or "70" instead of 64 for the adjustment points 3-7.

Also, the range of each step can be set to a range different from those in the preceding embodiment, such as to "64" at adjustment points 1-2, to "128" at adjustment point 2-adjustment point 6, and to "256 (255)" at adjustment points 6-9.

B4. Variation Example 4

The user interface for specifying output tone values for adjustment points is not limited to the gamma curve adjustment menu screen GM described in the embodiment. It is acceptable simply to be able to modify and specify output tone values in prescribed minimum increment/decrement units for each adjustment point. Consequently, it is possible to have, for example, a user interface with switched display, by arranging the gamma curve and the output tone value specifying portion M1 of the gamma curve adjustment menu screen GM so that these are instead displayed in different screens, with the respective screen being specified by the user.

B5. Variation Example 5

In the embodiment hereinabove, in order to determine output tone values corresponding to input tone values between adjustment points, the gamma curve adjusting module 10*b* calculates them through linear interpolation based on the output tone values determined for the adjustment points; however, rather than linear interpolation, a n-order function (where n is an integer equal to 2 or greater) passing through several adjustment points could be derived, and values calculated on the basis of this function, for example.

B6. Variation Example 6

In the embodiment hereinabove, during gamma correction, the gamma correction module 11 performs RGB/YUV conversion, and then performs gamma correction on the basis of the converted image data (YUV); however, it would be possible to carry out gamma correction on the unmodified RGB data instead. In this case, gamma correction LUTs would be provided for R, G, B components, respectively, and gamma correction performed according to the gamma correction LUT for each color component.

B7. Variation Example 7

In the embodiment hereinabove, the menu screen generating module 10*a* and the gamma curve adjusting module 10*b* are provided to the projector PJ and the gamma curve adjustment process is carried out in the projector PJ; however, it would be possible instead to provide these functional modules as a separate device, with the gamma curve adjustment process being carried out by this device. For example, these functional modules could be provided in a PC, with the gamma curve adjustment process being carried out in the PC.

In this case, the user, while viewing a gamma curve adjustment menu screen created by the menu screen generating module in the computer, specifies output tone values for the adjustment points. The gamma curve adjusting module provided to the computer then performs the gamma curve adjustment process in the same manner as in the embodiment hereinabove, and on the basis of the output tone values specified for the adjustment points, determines output tone values corresponding to all input tone values. The output tone values determined in this way are then output to the projector via a recording medium or network, and the gamma correction LUT updates with the output tone values input to the projector.

B8. Variation Example 8

In the embodiment hereinabove, the arrangement employs a projector PJ furnished with a gamma curve adjusting module and a gamma correction module for gamma correction and display of input images; however, the invention is not limited thereto, and may be employed in other arrangements such as a liquid crystal display, CRT (cathode ray tube), PDP (plasma display panel), FED (field emission device), or other type of image display devices.

What is claimed is:

1. A gamma curve adjustment device being used to adjust a gamma curve, wherein the gamma curve indicates a relationship of input tone values to output tone values and the gamma curve is used in a gamma correction circuit that performs gamma correction an image signal, the gamma curve adjustment device comprising:
a user interface module configured to enable a user to specify desired output tone values for a plurality of pre-established adjustment points on the gamma curve; and
an adjustment module configured to adjust the gamma curve such that the output tone value at each adjustment point matches the value specified through the user interface module,
wherein the plurality of adjustment points are established such that the adjustment points at a center of the gamma curve are more closely spaced in the input direction than the adjustment points at the ends of the gamma curve;
the center cart of the gamma curve is a part of the gamma curve in a tone range from the lower 20% to 60% of the entire input tone value range;
the user interface module is configured to increase or decrease the output tone values in units of minimum increment/decrement steps which are pre-established for adjustment points, thereby enabling the user to specify the output tone value at each adjustment point;
the minimum increment/decrement steps are established such that, for a least some adjustment points among the plurality of adjustment points, the minimum increment/decrement step established for these adjustment points differs from the minimum increment/decrement step established for other adjustment points; and
the minimum increment/decrement steps for adjustment points are established such that the minimum increment/decrement step established for the adjustment points present in the low tone range of the input tone values is greater than the minimum increment/decrement step established for the adjustment points present in the high tone range of the input tone values.

2. The gamma curve adjustment device according to claim 1 wherein
the minimum increment/decrement steps for adjustment points are established such that the minimum increment/decrement step established for the adjustment points present in a first tone range from the lower 20% to 60% of the entire input tone value range is greater than the minimum increment/decrement step established for the adjustment points present in a second tone range of the entire input tone value range excluding the first tone range.

3. An image display device, comprising:
a gamma curve adjustment device according to claim 1;
a gamma correction circuit; and
a display module;
wherein the gamma correction circuit is configured to perform gamma correction of an image signal, using the gamma curve adjusted by the gamma curve adjustment device, and
the display module is configured to display an image according to the gamma-corrected image signal.

4. An image display device according to claim 3 wherein:
the user interface module includes a gamma-curve adjustment menu screen displayed on the display unit; and
the gamma-curve adjustment menu screen is displayed superimposed over the image according to the gamma-corrected image signal.

5. An image display device according to claim 4 wherein:
the gamma-curve adjustment menu screen includes an adjustment point selector and an adjustment point indicator,
the adjustment point selector is configured to enable a user to select a target adjustment point for which the user specifies the desired output tone value, among the plurality of pre-established adjustment points; and
the adjustment point indicator indicates which adjustment point is selected as the target adjustment point among the plurality of pre-established adjustment points.

6. A method of establishing adjustment points for use in a gamma correction circuit that performs gamma correction of an image signal, wherein the method is used to establish a plurality of adjustment points on a gamma curve indicating the relationship of input tone values to output tone values, the method comprising the step of:
establishing the plurality of adjustment points such that the adjustment points at a center part of the gamma curve are more closely spaced in the input direction than the adjustment points at the ends of the gamma curve; and
establishing minimum increment/decrement steps for increasing or decreasing the output tone values for the adjustment points, wherein:
the center part of the gamma curve is a part of the gamma curve in a tone range from the lower 20% to 60% of the entire input tone value range;
the minimum increment/decrement steps are established such that, for a least some adjustment points among the plurality of adjustment points, the minimum increment/decrement step established for the adjustment points differs from the minimum increment/decrement unit established for other adjustment points; and
the minimum increment/decrement steps for adjustment points are established such that the minimum increment/decrement step established for the adjustment points present in the low tone range of the input tone values is greater than the minimum increment/decrement step established for the adjustment points present in the high tone range of the input tone values.

* * * * *